United States Patent [19]

Kobayashi et al.

[11] 4,439,766

[45] Mar. 27, 1984

[54] DOPPLER RADAR HAVING PHASE MODULATION OF BOTH TRANSMITTED AND REFLECTED RETURN SIGNALS

[75] Inventors: Herbert S. Kobayashi, Webster; Paul W. Shores; Patrick Rozas, both of Houston, all of Tex.

[73] Assignee: The United States of America as represented by the Administrator of the National Aeronautics & Space Administration, Washington, D.C.

[21] Appl. No.: 266,687

[22] Filed: May 22, 1981

[51] Int. Cl.³ .............................................. G01S 9/44
[52] U.S. Cl. ..................................... 343/9 R; 343/17.5
[58] Field of Search ............... 343/5 BD, 9 R, 17.2 R, 343/17.5, 8, 17.2 PC, 5 R, 112 CA, 14; 367/90, 91, 99, 909

[56] References Cited

U.S. PATENT DOCUMENTS

| | | | |
|---|---|---|---|
| 2,991,471 | 7/1961 | Pritchard | 343/5 R X |
| 3,388,398 | 6/1968 | Kratzer et al. | 343/8 X |
| 3,634,860 | 1/1972 | Rittenbach | 343/9 R |
| 3,750,171 | 7/1973 | Faris | 343/14 X |
| 3,750,172 | 7/1973 | Tresselt | 343/9 R X |
| 4,019,185 | 4/1977 | Morgan | 343/17.5 X |
| 4,042,925 | 8/1977 | Albanese et al. | 343/14 |
| 4,184,154 | 1/1980 | Albanese et al. | 343/9 R |
| 4,241,347 | 12/1980 | Albanese | 343/9 R |

Primary Examiner—Maynard R. Wilbur
Assistant Examiner—M. Gordon
Attorney, Agent, or Firm—Marvin F. Matthews; John R. Manning

[57] ABSTRACT

A microwave radar signal is generated (12) for transmission through an antenna (20). Before transmission, the signal is phase modulated (18) by 0° or 90° amounts during each alternate half-cycles of an intermediate frequency (IF) clock signal (26). After transmission and return, the signal is again phase modulated (18) the same amounts during each alternate half-cycles. The return phase modulated signal is mixed (24) with a leakage signal component of the microwave signal, leaving an IF doppler. The IF doppler signal may then be amplified (30), removing any requirement that direct current level signals be amplified and also removing the effect of detector noise from the doppler signal.

10 Claims, 6 Drawing Figures

DOPPLER RADAR HAVING PHASE MODULATION OF BOTH TRANSMITTED AND REFLECTED RETURN SIGNALS

ORIGIN OF THE INVENTION

The invention described herein was made by employees of the U.S. Government and may be manufactured and used by or for the Government of the United States of America for governmental purposes without the payment of any royalties thereon or therefor.

TECHNICAL FIELD

The present invention relates to doppler radar, particularly the measurement of velocities at near zero doppler frequencies.

BACKGROUND ART

Generally, in the past three types of radar have been used—pulse radar, continuous wave (CW) radar and doppler radar. The first two types are expensive and may not measure distances at close range. The third type, or doppler radar, is often used by law enforcement officers in checking motor vehicle speed. It has been generally inexpensive, reliable and accurate and has worked at close ranges. However, doppler radar has had problems measuring low velocity targets. In order for doppler radar to measure low velocities (near zero), certain circuit components including a mixer, filter amplifier and read-out circuit had to be directly coupled. However, in measuring velocities near zero, a problem existed in the amplifier and filter portion since the amplifier was required to have a direct current response and the filter was required to track down to zero frequency.

In the detector circuit of the doppler radar, a direct current was formed by diode circuitry together with an alternating current signal resulting from the reflected return doppler signal.

Due to the requirement of compensation for propagation losses, the detector signal often had to be amplified by a factor of as much as $10^6$. In addition to this sort of gain, to allow for wide variations in speed an amplifier was required to amplify low doppler counts, often near zero, for relatively little relative movement. An amplifier having such a magnitude of gain and operating at very low frequencies presents severe design problems. Further, the detector often had an offset on the order of one-half volt. Amplifying this extraneous voltage by a factor of $10^6$ could obscure the meaningful information in the doppler signal. Further, as frequencies decreased, detector noise (also known as 1/f noise) became greater. Amplification of this noise again could often mask doppler information.

Certain prior art patents relating to radar have utilized some form of phase modulation in portions of their systems. In U.S. Pat. Nos. 3,388,398; 4,019,185; 4,042,925 and 4,184,154, the transmitted radar signal was phase modulated by a pseudo-random code and the returned radar signal was cross-correlated with the pseudo-random code, apparently either in order to increase the effective detection ranges of the radar or to eliminate range ambiguities. One other patent, U.S. Pat. No. 3,750,172, used multiple frequencies rather than phase modulation in order to render the radar insensitive to targets beyond a preselected range. So far as is known, however, none of these radar systems have dealt with the problem of close ranges or near zero velocities, situations which can occur in aircraft or spacecraft.

DISCLOSURE OF INVENTION

Briefly, the present invention relates to a microwave doppler radar system for detecting, with transmitted radar signals, the range rate of an object at close range from returned signals reflected from the object. Both the transmitted and returned signals are periodically phase modulated, preferably by a like amount of predetermined phase shift, during the same one of two alternate half cycles of an established operating frequency. The returned signal is multiplied with the transmitted signal to form an intermediate frequency signal. The intermediate frequency signal is then amplified and demodulated to form a doppler signal indicative of the range rate of the object.

With the present invention the intermediate frequency signal which could vary, for example, in amplitude from one hundred millivolts to as low as one microvolt can be easily amplified without requiring a direct current amplifier with its attendant drift problems. Further, the intermediate frequency (IF) signal can be filtered for less noise around the IF frequency rather than in base band as was done in prior doppler radar.

DESCRIPTION OF PREFERRED EMBODIMENT

Figure 1:
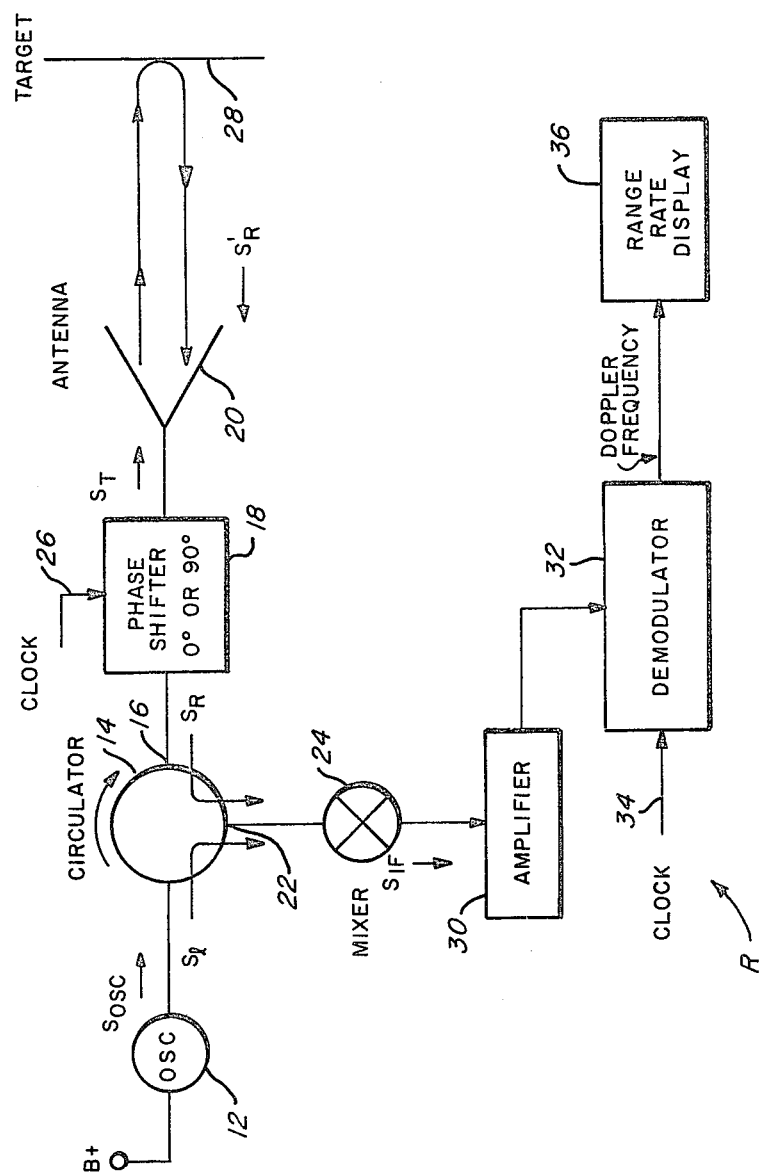
FIG. 1 is a schematic electrical circuit diagram of a doppler radar system according to the present invention.

In the drawings, a doppler radar system R (FIG. 1) with phase modulation of both the transmitted and reflected return signal is shown. In the radar system R, a radar signal is generated by the application of a low direct current voltage, such as ten volts, from a power supply to an oscillator 12. The oscillator 12 may be, for example, a Gunn diode or any other suitable oscillator which generates a microwave signal, on the order of around ten GHz. The microwave signal formed in the oscillator 12 is passed through a circulator 14 to two ports. A first port 16 is the transmit-receive port and leads through a phase shifter 18 to an antenna 20 through which a transmitted microwave radar signal $S_T$ is transmitted and received. A second port 22 serves as a signal detecting port and conducts the returned radar signals to a mixer 24. The port 22 further conducts a leakage signal $S_1$, in the form of a portion of the signal formed in the oscillator 12, to the mixer 24 so that a product signal is formed between the leakage signal $S_1$ and a returning signal $S_R$, for reasons to be set forth.

Figure 2:
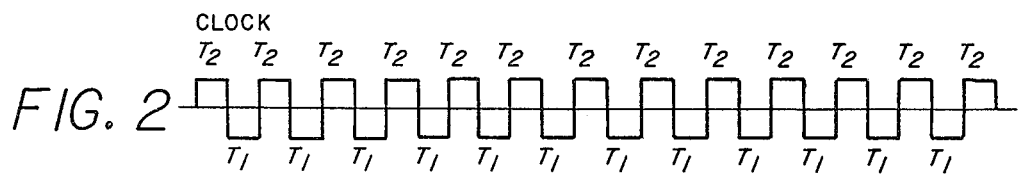
FIG. 2 is the waveform of the clock signal

The phase shifter 18 receives a clock signal (FIG. 2) of an established operating frequency. As can be seen in FIG. 2, the clock signal is composed of alternating half-cycles $T_1$ and $T_2$. In the phase shifter 18, each of the signals presented thereto from the port 16 and antenna 20, representing both the transmitted signal $S_T$ and the returned signal $S_R$ have no, or 0°, phase shift imposed thereon during the first one $T_1$ of the alternate half-cycles of the clock signal present on input 26. Conversely, during the other of the alternate half-cycles $T_2$, each of the signals $S_T$ and $S_R$ have a $\pi/2$ or 90° phase shift imposed thereon.

The transmitted signal $S_T$ then passes from the phase shifter 18 to the antenna 20, from which it travels to and is reflected by a target, if one is present, designated symbolically at 28. The microwave radar signal $S'_R$ reflected from the target 28 then returns to the antenna 20, from which it passes as the reflected signal $S'_R$ to the phase shifter 18, undergoing phase shift in the manner set forth above depending upon the half-cycle of the clock signal.

Figure 3:
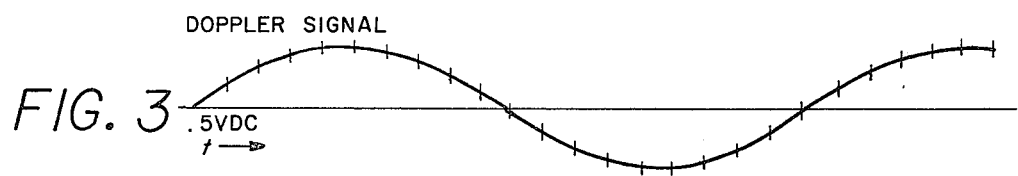
FIG. 3 is the Doppler signal with 0° phase shift
Figure 5:
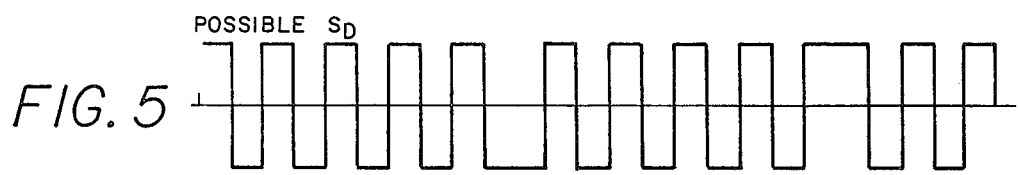
FIG. 5 is the IF signal amplified into saturation
Figure 6:
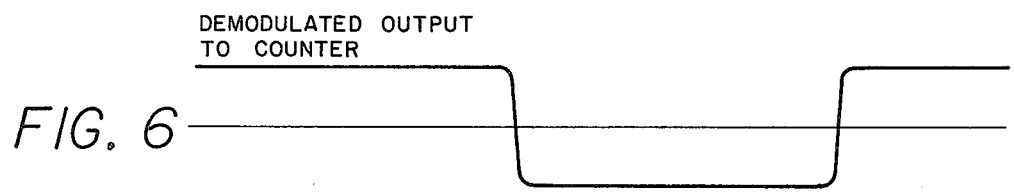
FIG. 6 is the demodulated output.

The return signal $S_R$ passes from the phase shifter 18 through the circulator 14 and port 22 to the mixer 24. As has been set forth above, the circulator 14 additionally provides the signal $S_1$ from the oscillator 12 to the mixer 24. The mixer 24 forms a product signal $S_{IF}$ (FIG. 4) which is then provided to an amplifier 30 for amplification and filtering about a center intermediate frequency (IF) signal corresponding to the clock signal provided to the phase shifter 18 over input 26. The output of the amplifier 30 for an example doppler signal (FIG. 3) is shown at FIG. 5. The output of the amplifier 30 is then furnished to a demodulator 32. The demodulator 32 further receives the clock signal provided to the phase shifter 18 at an input terminal 34 so that the doppler signal present in the output of the amplifier 30 may be demodulated, forming an example signal shown in FIG. 6 which is provided to a suitable display indicator 36.

With the present invention, it is possible to phase modulate the path of both the transmitted signal $S_T$ and the reflected return signal $S_R$ in the phase shifter 18 by electronically changing the path by ± one-fourth wave length at a suitable intermediate frequency signal, for example ten-thousand times per second. This causes the reflected return signal $S_R$ entering the mixer 24 to be phase modulated $\pm\pi/2$ radians at an intermediate frequency of ten-thousand times per second. The circulator 14 forms a sum of the transmitter leakage signal $S_1$ and the reflective signal $S_R$ which is fed to the diode mixer 24. As has been set forth above, the mixer 24 forms an output signal which has a direct current term proportional to the sum of the RMS values of the leakage signal $S_1$ and the reflective signal $S_R$. In addition to this direct current term, the output of the mixer 24 contains noise and the product of the leakage signal $S_1$ and the return signal $S_R$. The doubled frequency terms formed by multiplication of the leakage signal and the return signal in the mixer 24 are removed by filtering in the amplifier 30.

For situations where:
(a) the period of the clock signal very greatly exceeds the roundtrip delay time between antenna and target, or Period of clock >> roundtrip delay time; and (b) the maximum doppler frequency is very much less than the clock frequency, or Max doppler freq << clock frequency with the present invention it can be shown that the output signal from the amplifier 30 is a bi-phase modulated signal containing a noise component, a clock signal and a doppler component introduced by relative motion of the target 28 with respect to the antenna 20. This type of signal according to the present invention can be amplified and filtered to reduce the noise component much more easily than a base band signal of the type produced by prior doppler radars.

Thus, with the present invention, the alternating doppler signal is translated to an intermediate frequency (IF) where such signal has less noise. This IF signal further can be filtered and demodulated at a high level so that the doppler signal can be displayed for velocity values as low as zero. Further, at the intermediate frequency level, the direct current signal formed in the mixer 24 is filtered out and thus does not affect the doppler information.

For ease and understanding the present invention, the following explanation of the operation is set forth:

DEFINITIONS $A_1$—amplitude constant which depends on transmitting power, etc.
$A_2$—amplification
$\omega_0$—$2\pi \times 10$ GHz
$t$—time
$\alpha_1$—attenuation in waveguide
$\alpha_2$—attenuation of the reflected return signal
$\theta$—phase shift of signal return
$t_d$—total time delay between transmitted and reflected return signal
D—distance between transmitter-receiver and target
C—speed of wave
B—reference leakage signal amplitude
$T_1$, $T_2$: $T_1$ low and $T_2$ high clock
IF—intermediate frequency
$S_{IF}$—IF signal
$S_D$—high level doppler signal Based on the foregoing definitions, the following signals are present in the radar system R:

Oscillator signal $$S_{osc} = A_1 \sin \omega_0 t$$

Transmitted signal $$S_T = A_1\alpha_1 \sin [\omega_0 t + (0(T_1), \pi/2(T_2))]$$

The reflected return signal $$S_R = A_1\alpha_1\alpha_2 \sin [\omega_0 t - \theta - \omega_0 t_d + (0(T_1), \pi(T_2))]$$

Reference leakage signal $$S_1 = A_1 B \sin \omega_0 t$$

The mixer detector output signal $$S_{IF} = (S_R + S_1)^2$$

$$S_{IF} = (A_1\alpha_1\alpha_2 \sin [\omega_0 t - \theta - \omega_0 t_d + (0(T_1), \pi(T_2))])^2 + (A_1 B \sin \omega_0 t)^2 + 2A_1 B \sin \omega_0 t \times A_1\alpha_1\alpha_2 \sin [\omega_0 t - \theta - \omega_0 t_d + (0(T_1), \pi(T_2))]$$

As has been set forth above, in the amplifier 30, the direct current term in the mixer detector output signal $S_{IF}$ and the double frequency $2\omega_0$ are filtered out of the mixer detector output signal. Further, the remaining portions of the mixer detector output signal can be categorized as a modified signal $S'_{IF}$ in the form of the product of two signals at the microwave frequency $\omega_0$ as follows:

$$S'_{IF}=2A_1B \sin \omega_o t x A_1\alpha_1\alpha_2 \sin [\omega_o t - \theta - \omega_o t_d + (0(T_1), \pi(T_2))]$$

By performing this multiplication operation in the mixer 24 and filtering out the $2\omega_O$ frequency term in the amplifier 30, the resultant signal presented to the demodulator 32 is a signal which can be characterized as follows:

$$S'_{IF}=A_1{}^2 B\alpha_1\alpha_2 \cos [\theta + \omega_o t_d - (0(T_1), \pi(T_2))]$$

As has been set forth above, this signal can be amplified to a high level without losing the doppler information since it is at an intermediate frequency, in effect substituting the amplification $A_2$ for the initial amplitude constant $A_1$.

In the demodulator 32, the doppler signal $S_D$ is formed as follows:

$$S_D = A_2{}^2 B\alpha_1 \alpha_2 \cos[\theta + \omega_o t_d - (0(T_1), \pi(T_2))] \times \cos(0(T_1), \pi(T_2))]$$

$$= \tfrac{1}{2} A_2{}^2 B\alpha_1\alpha_2[\cos(\theta\; \omega_o t_d) + \cos(\theta + \omega_o t - 2(0(T_1), \pi(T_2))]$$

The last component of frequency of the preceding equation represents twice the clock signal (FIG. 2) which is a much higher frequency than the other two components of the doppler signal $S_D$, which can also be filtered out in demodulator 32, forming the output doppler frequency signal $S_D$ expressed as follows:

$$S'_D = \tfrac{1}{2} A_2{}^2 B \alpha_1 \alpha_2 \cos(\theta + \omega_o t_d)$$

which is presented to the range rate display 36.

For a constantly moving target, the doppler frequency is represented by the time derivative of the preceding expression, and since $\theta$ is a constant, the doppler frequency $F_D$ is defined as follows:

$D =$ distance to target $$t_d = \frac{2D}{C}$$

$$W_{doppler}\, t = \theta + \omega_o \frac{2D}{C}$$

$$\frac{d}{dt} W_{doppler}\, t = \frac{d}{dt}\left(\theta + \omega_o \frac{2D}{C}\right)$$

Distance is function of time $$F_D = 0 + F_0 2 \frac{V_r}{C}$$

where $F_O$ is the oscillator frequency, $V_r$ is the radial velocity and $W_{doppler}$ is $2\pi$ times the doppler frequency.

Figure 4:
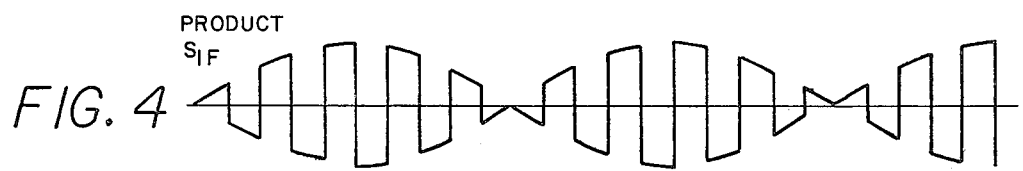
FIG. 4 is the product signal, $S_{IF}$ with 0° and 90° phase shift

With the present invention, the low level detected signal which can vary from 0.1 volt to one microvolt can be easily amplified at the intermediate frequency (FIG. 4). This signal can then be filtered for less noise around the center frequency at the intermediate frequency rather than having to be filtered in the base band as with prior art doppler type radars. This intermediate frequency signal can then be demodulated at a high level and the doppler frequency can be displayed for velocity values beginning at zero.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention:

We claim:

1. A doppler radar system for detecting the range rate of an object at close range comprising:
   (a) Local oscillator means for generating a radar signal;
   (b) a single antenna for transmitting and receiving radar signals;
   (c) means for phase modulating both the transmitted and returned signals with the same modulator and wherein said modulation occurs prior to any signal mixing;
   (d) means for mixing the returned signal with the local oscillator signal to form an intermediate frequency signal;
   (e) means for amplifying the intermediate frequency signal; and
   (f) means for demodulating the amplified intermediate frequency signal to form a doppler signal indicative of the range rate of the object.

2. The radar system of claim 1, wherein said means for phase modulating comprises:
   phase shift means.

3. The radar system of claim 2, wherein said phase shift means operates on alternate half cycles of an established operating frequency and further comprises:
   (a) means for imposing no phase shift in one of the alternate half cycles; and
   (b) means for imposing a predetermined phase shift in the other of the alternate half cycles.

4. The radar system of claim 3, wherein said means for imposing a predetermined phase shift comprises:
   means for imposing a 90° phase shift.

5. The radar system of claim 3, wherein the established operating frequency is an intermediate frequency signal and further including:
   clock means for forming the intermediate frequency signal.

6. The radar system of claim 1, further including:
   means for displaying the demodulated signal to indicate the range rate of the object.

7. A method of detecting the range rate of an object at close range comprising the steps of:
   (a) forming a radar signal with oscillator means;
   (b) transmitting and receiving said signals with the same antenna;
   (c) phase modulating both the transmitted and returned signals with the same modulator prior to any signal mixing;
   (d) mixing the returned signal with the oscillator signal to form an intermediate frequency signal;
   (e) amplifying the intermediate frequency signal; and
   (f) demodulating the amplified intermediate frequency signal to form a doppler signal indicative of the range rate of the object.

8. The method of claim 7, wherein said step of phase modulating is performed during alternate half cycles of an established operating frequency and comprises the steps of:
   (a) imposing no phase shift in one of the alternate half cycles; and (b) imposing a predetermined phase shift in the other of the alternate half cycles.

9. The method of claim 8, wherein said step of imposing a predetermined phase shift comprises the step of: imposing a 90° phase shift.

10. The method of claim 7, further including the step of:
displaying the demodulated signal to indicate the range rate of the object.

* * * * *